United States Patent
Levin et al.

(10) Patent No.: US 10,430,939 B1
(45) Date of Patent: Oct. 1, 2019

(54) FULL DISPLAY PANEL GRID-BASED VIRTUAL IMAGE DISTANCE TEST SUBSYSTEM FOR EYECUP ASSEMBLIES OF HEAD MOUNTED DISPLAYS

(71) Applicant: Facebook Technologies, LLC, Menlo Park, CA (US)

(72) Inventors: Kieran Tobias Levin, Redwood City, CA (US); Ye Yin, Pleasanton, CA (US); Simon Hallam, San Jose, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 15/687,666

(22) Filed: Aug. 28, 2017

(51) Int. Cl.
| | | |
|---|---|---|
| *G06T 7/00* | (2017.01) | |
| *G06T 7/73* | (2017.01) | |
| *G06T 7/90* | (2017.01) | |
| *G06T 7/55* | (2017.01) | |
| *G06T 7/174* | (2017.01) | |
| *H04N 5/232* | (2006.01) | |
| *H04N 9/31* | (2006.01) | |

(Continued)

(52) U.S. Cl.
CPC .............. *G06T 7/001* (2013.01); *G06T 7/174* (2017.01); *G06T 7/55* (2017.01); *G06T 7/74* (2017.01); *G06T 7/90* (2017.01); *H04N 5/23296* (2013.01); *G06F 3/147* (2013.01); *G06T 19/006* (2013.01); *G06T 2207/20021* (2013.01); *G06T 2207/30121* (2013.01); *G06T 2207/30168* (2013.01); *H04N 9/3182* (2013.01)

(58) Field of Classification Search
CPC ........ G02B 27/0172; G02B 2027/0178; G02B 27/017; G02B 27/0179; G02B 3/14; G06T 19/006; G06T 7/001; G06T 7/74; G06T 7/90; G06T 7/55; G06T 7/174; H04N 5/23296; H04N 9/3182
See application file for complete search history.

(56) References Cited

U.S. PATENT DOCUMENTS

| | | | |
|---|---|---|---|
| 10,075,685 B1 * | 9/2018 | Fulghum | .............. H04N 9/3191 |
| 2013/0041216 A1 * | 2/2013 | McDowall | ............... G02B 5/04 600/109 |

(Continued)

FOREIGN PATENT DOCUMENTS

WO   WO-2016203654 A1 * 12/2016 ........... H04N 13/117

*Primary Examiner* — Kenny A Cese
(74) *Attorney, Agent, or Firm* — Fenwick & West LLP (57) ABSTRACT

An optical evaluation workstation evaluates a virtual image distance of eyecup assemblies of a head mounted display (HMD). The workstation includes an eyecup assembly feed assembly configured to receive an eyecup assembly of an HMD. The eyecup assembly comprising an optics block rigidly fixed to an electronic display panel. The workstation includes a lens assembly positioned at a fixed distance from the eyecup assembly. The workstation includes a movable imaging sensor assembly positioned along the alignment axis and configured to capture one or more images of the one or more test patterns presented by the eyecup assembly when the imaging sensor assembly is at different positions. The optical evaluation workstation includes a control module configured to determine one or more virtual image distances of the eyecup assembly using the plurality of images captured by the imaging sensor assembly.

20 Claims, 6 Drawing Sheets

(51) Int. Cl.
*G06F 3/147* (2006.01)
*G06T 19/00* (2011.01)

(56) References Cited

U.S. PATENT DOCUMENTS

2016/0363770 A1\* 12/2016 Kim .................... G02B 27/0172
2018/0152694 A1\* 5/2018 Oonishi ............... H04N 13/117

\* cited by examiner

FULL DISPLAY PANEL GRID-BASED VIRTUAL IMAGE DISTANCE TEST SUBSYSTEM FOR EYECUP ASSEMBLIES OF HEAD MOUNTED DISPLAYS

BACKGROUND

The disclosure relates generally to testing optical components, and specifically to systems for performing optical quality assurance tests on eyecup assemblies of head-mounted displays (HMDs).

An HMD includes dual eyecup assemblies. Each eyecup assembly may include an electronic display and various optical elements. After assembly, a user places the HMD such that the user's eye is located at an exit pupil location of the HMD. Due to imperfect manufacturing tolerances, the optical quality of an image presented at the exit pupil may not be optimal. For example, the virtual image distance may not be optimal. The assessment of the virtual image distance of the image produced at the exit pupil is difficult, especially in if the assessment is to be performed quickly in an assembly line setting. Furthermore, the quick testing of the virtual image distance of different areas of the entire display area of the image is difficult as well.

SUMMARY

An optical evaluation workstation is designed to simulate the environment of a HMD to test for various quality metrics of an eyecup assembly of the HMD. The optical evaluation workstation includes an eyecup assembly feeder, a lens assembly, an imaging sensor assembly, and a control module. The eyecup assembly feeder is configured to receive an eyecup assembly of a head mounted display (HMD). The eyecup assembly includes an optics block (e.g., an assembly of various lenses) and an electronic display panel (e.g., an organic light emitting diode panel).

The lens assembly is positioned at a fixed distance from the eyecup assembly along an alignment axis passing through the optics block and electronic display panel of the eyecup assembly when the eyecup assembly is received by the eyecup assembly feeder.

The imaging sensor assembly is positioned along the alignment axis and configured to capture one or more images of the one or more test patterns presented by the electronic display panel through the optics block. The imaging sensor assembly is configured to captures the one or more images at different positions along the alignment axis.

The control module is configured to determine one or more virtual image distances of the eyecup assembly using the plurality of images captured by the imaging sensor assembly at different positions. The virtual image distance is a distance from a position of the exit pupil of the eyecup assembly to a virtual image of the electronic display panel, as viewed through the optics block.

Using such a system, the virtual image distance of different areas of the displayed image of each eyecup assembly may be quickly determined. This information may be reported for each eyecup assembly, and may be used to perform fine-tuned alignments of each eyecup assembly, such as the distance between the optics block and the electronic display panel, the selection of pairs of eyecup assemblies for each HMD, and so on.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Head Mounted Display (HMD) with Eyecup Assembly

Figure 1A:
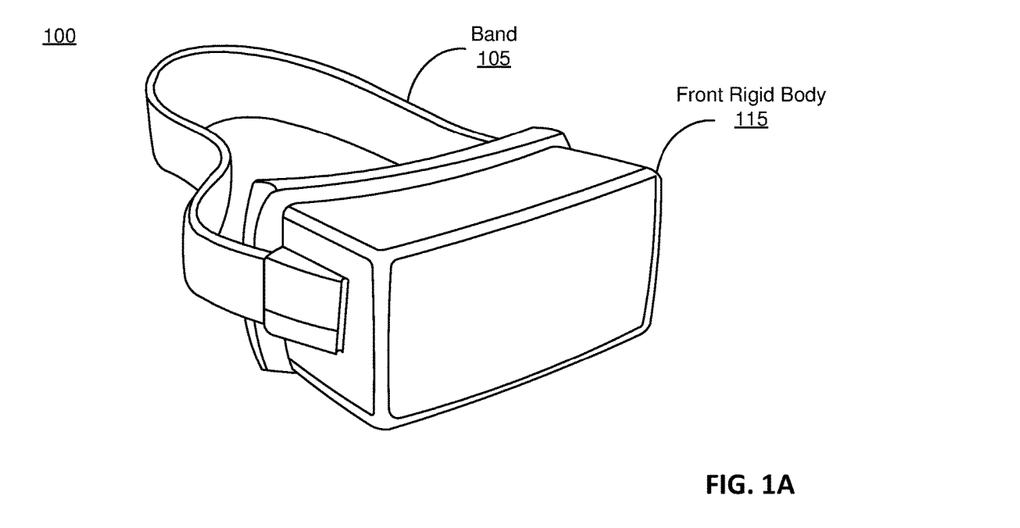
FIG. 1A is a diagram of a HMD, in accordance with an embodiment.

FIG. 1A is a diagram of an HMD 100, in accordance with an embodiment. The HMD 100 is a head-mounted display that presents media to a user. Examples of media presented by the HMD 100 include one or more images, video, audio, or some combination thereof. The media presented to the user may have an interactive element. In some embodiments, audio is presented via an external device (e.g., speakers and/or headphones) that receives audio data based on the audio information. The HMD 100 is generally configured to operate as a virtual reality (VR) HMD. However, in some embodiments, the HMD 100 may be modified to also operate as an augmented reality (AR) HMD, a mixed reality (MR) HMD, or some combination thereof. For example, in some embodiments, the HMD 100 may augment views of a physical, real-world environment with computer-generated elements (e.g., images, video, sound, etc.).

The HMD 100 shown in FIG. 1A includes a band 105 and a front rigid body 115. The band 105 is configured for users to wear the HMD 100 on their head. The front rigid body 115 includes one or more optical elements which together display media to users. As discussed below in conjunction with FIG. 1B, the front rigid body 115 includes at least one eyecup assembly for directing image lights to user's eye(s).

Different components of a HMD 100 contribute to quality metrics of the elements inside the HMD. For example, optical elements, display elements, the tolerances of structural elements affixing the optical and display elements, and other components of the HMD may affect the quality metrics of the HMD. A quality metric is a characteristic which indicates how well an element of the HMD meets certain performance requirements. For example, one quality metric is a virtual image distance of an image produced by the HMD 100. The virtual image distance is the distance at from the exit pupil of the HMD 100 where a virtual image is produced. This virtual image distance may furthermore be computed for multiple individual regions of the image. The quality metric of the virtual image distance is further discussed below with reference to FIGS. 2-6.

Figure 1B:
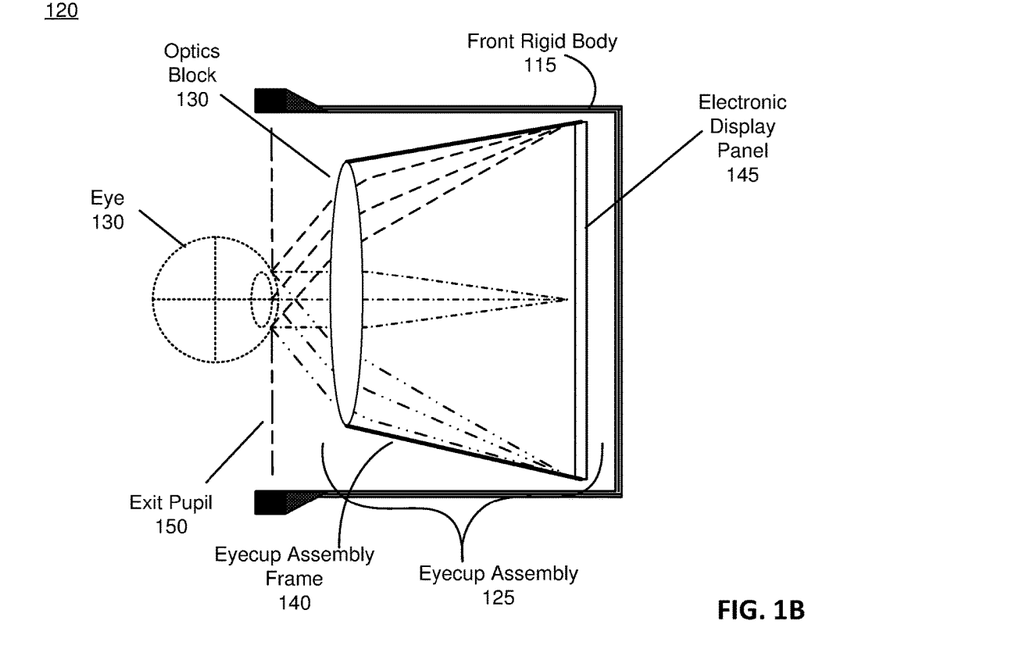
FIG. 1B is a cross section of the front rigid body and eyecup assembly of the HMD shown in FIG. 1A, in accordance with an embodiment.

FIG. 1B is a cross section 120 of the front rigid body 115 of the HMD 100 shown in FIG. 1A, in accordance with an embodiment. The cross section 120 of the front rigid body 115 includes an eyecup assembly 125. For purposes of illustration, FIG. 1B shows a cross section 120 associated with a single eye 130, but another eyecup assembly, separate from the eyecup assembly 125, provides altered image light to another eye of the user.

The eyecup assembly 125 includes an optics block 135, an eyecup assembly frame 140, and an electronic display panel 145 which together provide image light to an exit pupil 150. The exit pupil 150 is the location where a user's eye 130 is positioned when the user wears the HMD 100.

The electronic display panel 145 is positioned at a first distance from the exit pupil 150 which is the distance between the eye of a user and the image displayed on the display panel 145. The display panel 145 displays images to the user in accordance with data received from the HMD 100, or from another external source. In various embodiments, the electronic display panel 145 may comprise a single electronic display element or multiple electronic display elements (e.g., a display for each eye of a user). Examples of the electronic display panel 145 include: a liquid crystal display (LCD), an organic light emitting diode (OLED) display, an active-matrix organic light-emitting diode display (AMOLED), some other display, or some combination thereof.

The optics block 135 is positioned at a second distance from the electronic display panel 145 within the eyecup assembly 125. The optics block 130 magnifies received image light from the electronic display panel 145 and corrects for some optical errors associated with the image light and the corrected image light is presented to a user of the HMD 100. In various embodiments, the optics block 135 includes one or more optical elements—also referred to as viewing optical elements. Example optical elements included in the optics block 135 include: an aperture, a Fresnel lens, a convex lens, a concave lens, a filter, or any other suitable optical element that affects image light. Moreover, the optics block 135 may include combinations of different optical elements. In some embodiments, one or more of the optical elements in the optics block 135 may have one or more coatings, such as anti-reflective coatings. Note that although the optics block 135 may include more than one optical element, it is represented in the figures by a single elliptical shape.

The optics block 135 may be designed to correct one or more types of optical errors. Examples of optical errors include: two dimensional optical errors, three dimensional optical errors, or some combination thereof. Two dimensional errors are optical aberrations that occur in two dimensions. Example types of two dimensional errors include: barrel distortion, pincushion distortion, longitudinal chromatic aberration, transverse chromatic aberration, or any other type of two-dimensional optical error. Three dimensional errors are optical errors that occur in three dimensions. Example types of three dimensional errors include spherical aberration, chromatic aberration, field curvature, astigmatism, or any other type of three-dimensional optical error.

The eyecup assembly frame 140 directs light from the electronic display panel 145 to the optics block 135. The eyecup assembly frame 140 fixes the optics block 135 and electronic display panel 145 relative to each other. The eyecup assembly frame 140 may be composed of, e.g., foam, metal, plastic, some other suitable material that is opaque to visible light, or some combination thereof.

The electronic display panel 145 and the optical elements inside the optics block 135 may both affect the quality metrics. In particular, the virtual image distance produced by the eyecup assembly 125 may be affected by the distance between the electronic display panel 145 and the optics block 135 and the position of the optics block 135 relative to the electronic display panel 145. Due to the potential for the quality of the image produced by the eyecup assembly 125 to be affected negatively, an optical evaluation workstation, such as the one described herein, is developed to test for these quality metrics to ensure that the image produced by each eyecup assembly meets quality metric requirements.

Optical Evaluation Workstation

Figure 2:
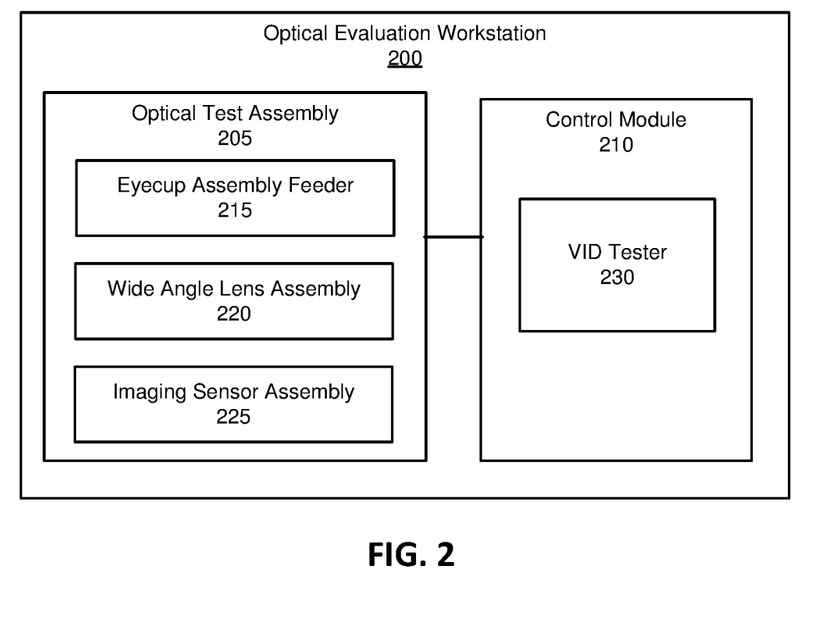
FIG. 2 is a system block diagram of an optical evaluation workstation, in accordance with an embodiment.

FIG. 2 is a system block diagram of an optical evaluation workstation 200, in accordance with an embodiment. Some embodiments of the optical evaluation workstation 200 have different components than those described here. Similarly, the functions can be distributed among the components in a different manner than is described here. The optical evaluation workstation 200 evaluates one or more quality metrics of an eyecup assembly 125 in an environment designed to replicate the environment inside the HMD 100. As described above, a quality metric is a characteristic which indicates how well an element or elements in the eyecup assembly 125 meets certain performance requirements. Example quality metrics may include spatial resolution, optical contrast, distortion, astigmatism, etc. In particular, the optical evaluation workstation 200 of FIG. 2 may be used to evaluate a quality metric indicating a virtual image distance of the image produced by the eyecup assembly 125.

The optical evaluation workstation 200 includes an optical test assembly 205 and a control module 210. The optical test assembly 205 tests quality metrics of the eyecup assembly 125 (e.g., the optics block 135, the electronic display panel 145) inside the HMD 100. In one embodiment, the optical test assembly 205 tests for a virtual image distance of the image produced by the eyecup assembly 125 of the HMD 100. The optical test assembly 205 includes an eyecup assembly feeder 215, and a wide angle lens assembly 220, and an imaging sensor assembly 2250.

The eyecup assembly feeder 215 includes one or more attachment elements that receive and removably attach or hold on to the eyecup assembly 125. In some embodiments, the eyecup assembly feeder 215 may include multiple attachment elements that attach to different parts (or sub-elements) of the eyecup assembly 125, such as the optics block 135, the eyecup assembly frame 140, or the electronic display panel 145. After the eyecup assembly feeder 215 receives the eyecup assembly 125, the eyecup assembly feeder 215 (or a user) places the eyecup assembly 125 in a test position. A test position is a specific position of the eyecup assembly 125 used to evaluate the eyecup assembly 125 for quality metrics.

The eyecup assembly 125 under test may be placed by the eyecup assembly feeder 215 in a testing position with the wide angle lens assembly 220 above the eyecup assembly 125 or to the side of the eyecup assembly 125, respectively. Furthermore, the eyecup assembly 125 may be placed by the eyecup assembly feeder 215 at a position such that an exit pupil of the eyecup assembly 125 aligns with the front of the wide angle lens assembly 220. Once the eyecup assembly feeder 215 places the eyecup assembly 125 in the testing position, it may also couple with the eyecup assembly 125 to provide communications and/or power to the eyecup assembly 125. The coupling may include a data connection for the electronic display panel 145, a power connection for the electronic display panel 145, and so on.

In one embodiment, the eyecup assembly feeder 215 is able to move in various directions and angles, up to six degrees of freedom, in order to position the eyecup assembly 125 under test in different positions relative to the wide angle lens assembly 220 according to different imaging instructions.

The wide angle lens assembly 220 gathers light from the eyecup assembly 125 under test at a first side of the wide angle lens assembly 220, and directs this light to the imaging sensor assembly 225225 at a second and opposite side of the wide angle lens assembly 220. The wide angle lens assembly 220 may be fixed at a particular distance from the eyecup assembly 125 under test. The wide angle lens assembly 220 is a lens with a wide field of view (e.g., 120 degrees). The field of view of the wide angle lens assembly 220 may be selected such that the focal length of the wide angle lens assembly 220 is the distance from the wide angle lens assembly 220 to the optics block 135 of the eyecup assembly 160 under test. In one embodiment, the wide angle lens assembly 220 is placed at an exit pupil location of the eyecup assembly 125 such that it is at a position in front of the eyecup assembly 125 corresponding to a position of a human eye relative to the eyecup assembly 125 when a user wears the HMD 100. In one embodiment, the F-stop of the wide angle lens assembly 220 is set such that objects outside the focal plane of the wide angle lens assembly 220 do not appear in focus when images of light from those objects are captured through the wide angle lens assembly 220. Additionally, the focus adjustment of the wide angle lens assembly 220, which may be actuated via a motor, may be directly controllable by the control module 210 via imaging instructions. The control module 210 may also be able to adjust the aperture of the wide angle lens assembly 220. Furthermore, the wide angle lens assembly 220 may be moved up to six degrees of freedom in order to be positioned in accordance with imaging instructions.

The imaging sensor assembly 225 captures images or videos (e.g., of test patterns) produced by the eyecup assembly 125 under test in accordance with the imaging instructions. In particular, the imaging sensor assembly 225 captures images produced by the electronic display panel 145 that have passed through the optics block 135 and the wide angle lens assembly 220. The imaging sensor assembly 225 is positioned such that light exiting the second side of the wide angle lens assembly 220 is captured by the imaging sensor assembly 225. The imaging sensor assembly 225225 may further be movable along an alignment axis passing through the wide angle lens assembly 220, and the eyecup assembly 125 under test, such that the distance between the imaging sensor assembly 225 and the wide angle lens assembly 220 (and the eyecup assembly 125) can vary. In one embodiment, the imaging sensor assembly 225 is able to move in various directions and angles, up to six degrees of freedom, in order to position the imaging sensor assembly 225 under test in different positions according to different imaging instructions.

In one embodiment, both the wide angle lens assembly 220 and the imaging sensor assembly 225 are positioned via structural elements (e.g., via one or more worm drives or ultrasonic actuators) in the optical evaluation workstation 200 such that they may additionally be translated along an x-y plane that is orthogonal to an axis that passes through the optics block 135 and the electronic display panel 145 of the eyecup assembly 125. This allows wide angle lens assembly 220 and the imaging sensor assembly 225 to be moved to make minor adjustments to its position, and reduces potential damage to the wide angle lens assembly 220 and the imaging sensor assembly 225 due to an accidental impact.

Additional details regarding the wide angle lens assembly 220 and the imaging sensor assembly 225 are described with reference to FIG. 3.

The control module 210 generates instructions for the optical evaluation workstation 200 to execute quality tests to measure various quality metrics of the eyecup assembly 125 under test. The instructions may be generated automatically or according to user parameters received by the control module 210. In the automatic case, the control module 210 may be previously pre-programmed to perform various quality and other tests upon the eyecup assembly 125 to be tested. Each quality test includes a set of imaging instructions which the control module 210 executes and/or which the control 210 transmits to the other components in the optical evaluation workstation 200, such as the eyecup assembly feeder 215, the wide angle lens assembly 220, or the imaging sensor assembly 225. In the case of the user provided parameters, the control 210 module may receive various user provided parameters, such as individual imaging instructions, or an instruction to test for a specific quality test. In one embodiment, the control 210 tests for the VID of the eyecup assembly 125 under test.

To do this, the control module 210 can instruct the imaging sensor assembly 225 to capture images and video, and to move along the alignment axis. In one embodiment, the control module 210 can also instruct the wide angle lens assembly 220 to change a focal distance, zoom level, or other characteristic.

In one embodiment, the control module 210 generates a mapping from pixels of the electronic display panel 145 to the pixels of an image sensor of the imaging sensor assembly 225, prior to performing any quality tests. This generation of the mapping may be accomplished by instructing the electronic display panel 145 to display various images including sequences of pixels, and instructing the imaging sensor assembly 225 (while at a certain distance to the eyecup assembly 160 under test) to capture these images. By generating the mapping, the control module 210 is able to determine a precise alignment of the electronic display panel 145 relative to the image sensor of the imaging sensor assembly 225 and the eyecup assembly 125. The mapping may later be used by the control module 210 to determine an exact position of any defects on the electronic display panel 145, as well as instruct the electronic display panel 145 to display images that have been corrected for various optical errors, such as those described above.

The control module 210 includes a virtual image distance (VID) tester 230 for performing a quality test to measure a quality metric indicating a virtual image distance of images produced by the eyecup assembly 125 under test.

As noted, the virtual image distance is the distance at from the exit pupil to a plane where a virtual image is produced (i.e., in focus). The virtual image corresponds to an image produced by the electronic display panel 145. For example, when source of image light, such as an image produced by the electronic display panel 145, is placed at a point along a perpendicular axis to a lens that has a distance to the lens that is shorter than the focal distance of the lens, then a person at the other side of the lens perceives a virtual image. Due to the way in which light is perceived, this virtual image appears to be a magnified version of the source image, but also appears to be further away than the actual distance from the source of the image to the lens, although no actual image light is produced at that virtual distance. The virtual image is produced at a point at which the rays of the image light were to converge if these rays were projected backwards.

Regarding the eyecup assembly 125 and referring to the above example, the VID of the eyecup assembly 125 is the distance from the exit pupil 150 to the virtual image produced via the electronic display panel 145 (the source image light) and the optics block 135 (the lens). Typically, the VID is set to approximately 2-5 meters to ensure a comfortable distance for a user viewing the image in the HMD, although the electronic display panel 145 is much closer to ensure a compact HMD device. The VID is based upon the distance between the optics block 135 and the electronic display panel 145 and the focal distance and configuration of the optics block 135.

In one embodiment, the VID tester 230 instructs the electronic display panel 145 to display a VID test pattern. The VID test pattern allows the VID tester 230 to determine the VID of the eyecup assembly 125 being tested. In one embodiment, the VID test pattern includes an image having a single color. The single color may be white, such that all wavelengths of the visible spectrum are produced by the electronic display panel 145. Furthermore, the VID tester 230 may instruct the electronic display panel 145 to display the VID test pattern at a maximum saturation (i.e., brightness). This may increase the signal to noise ratio when the image is captured. In one embodiment, multiple VID test patterns are used, and each test pattern may include an image of a primary color (e.g., red, green, and blue). The VID test pattern itself may include features from which the sharpness of the captured image can be determined. For example, it may comprise a series of lines having sharp borders. These lines may curve and converge at a point. The VID test pattern may comprise a series of other geometric shapes, such as solid circles. The VID test pattern may include an object or other element at every region of the image for which the VID is to be determined. For example, if the image displayed by the electronic display panel 145 is divided into 25 sections (i.e., a 5×5 grid), each section of the VID test pattern corresponding to one of these divided sections may include at least one test pattern element such that the VID at that section can be determined.

The VID tester 230 instructs the imaging sensor assembly 225 to capture multiple images of the VID test pattern assembly 225 at different distances from the imaging sensor assembly 225, and thus, change the distance between the imaging sensor assembly 225 and the wide angle lens assembly 220. The VID tester 230 may instruct the imaging sensor assembly 225 to capture these images while the imaging sensor assembly 225 is continuously moved, or the VID tester 230 may instruct the imaging sensor assembly 225 to move a fixed distance, stop, and capture one or more images. The range of distance through which the imaging sensor assembly 225 moves may include a back focus adjustment path. The back focus adjustment path is a path along which the imaging sensor assembly 225 moves and is parallel to an alignment axis passing through the eyecup assembly 125, wide angle lens assembly 220, and imaging sensor assembly 225 as shown below. This path may be sufficient in distance such that all possible VIDs of the eyecup assembly 125 under test can be evaluated. The range of distance of the back focus adjustment path may be experimentally determined by testing eyecup assemblies 165 with a minimum possible VID distance and ones with maximum possible VID distance based on estimated manufacturing variations that are possible.

The VID tester 230 receives from the imaging sensor assembly 225 both the captured images, and, for each captured image, the position of the imaging sensor assembly 225 along the back focus adjustment path at which the captured image was taken. The position can be measured as distance from the imaging sensor assembly 225 to one of the ends of the back focus adjustment path, such as the distance from the imaging sensor assembly 225 to the wide angle lens assembly. The result is that the VID tester 230 has multiple images that are captured by the imaging sensor assembly 225 at multiple points along the back focus adjustment path. As the distance of the imaging sensor assembly 225 correlates with a focal distance of the corresponding image that is captured, a further result is that the VID tester 230 has images captured at different focal lengths of the VID test pattern displayed by the electronic display panel 145 of the eyecup assembly 125 under test. Furthermore, due to the use of the wide angle lens in the wide angle lens assembly 220, the captured images each capture light from the entire area of the electronic display panel 145 (i.e., all portions of the electronic display panel 145), or most of the entire area (e.g., 95%).

The VID tester 230 evaluates the sharpness of the color channels of the captured images in order to determine the position of the imaging sensor assembly corresponding to the maximum sharpness value for each color channel. If one image was captured for each position of the imaging sensor assembly, the VID tester 230 divides each single image into multiple images, each image including the pixel intensity values of a single color channel. For example, the VID tester 230 may filter each of the images into their respective color channels (e.g., red, green, and blue). Note that the image received from the camera assembly 220 may be in a raw image format of the imaging sensor assembly 225 that allows the VID tester 230 to directly determine the sensor data for each subpixel of the imaging sensor of the camera without any or any significant post-processing applied by the imaging sensor assembly 225 (e.g., if the imaging sensor assembly 225 uses a Bayer color filter array, then each pixel is composed of a red, blue, and two green subpixels). If the VID tester 230 receives a raw image format from the camera, the VID tester 230 can separate the raw image into the respective color channels using the subpixel information within the raw image format.

In the above case, the VID tester 230 determines the position of the imaging sensor assembly 225 at which maximum (i.e., greatest or largest) sharpness value is achieved for each color channel. For each color channel, the VID tester 230 determines the maximum sharpness value by evaluating the sharpness for each color channel of each image captured over the different positions of the imaging sensor assembly 225 until the VID tester 230 identifies the image for that color channel that has the highest sharpness value of all the evaluated sharpness values. To determine sharpness for each color channel in each image, the VID tester 230 may use a Sobel operator (also known as a Sobel-Feldman operator) on the image filtered by the selected color channel, which computes an approximation of the gradient of the image intensity (using convolution), and with a result that emphasizes the edges in images. Using the Sobel operator, the VID tester 230 may derive a sharpness score based on the magnitude of the gradients within the image (as filtered by the selected color channel). For example, a large gradient (i.e., change) over a particular distance in the image may indicate a sharp transition, i.e., a high sharpness, and the score may be based on a weighted average of these gradients.

An exemplary illustration of imaging sensor assembly position versus sharpness for red, green, and blue color channels in an image is described below with reference to FIG. 4.

In one embodiment, the imaging resolution of the imaging sensor assembly 225 is high enough such that the captured images of the camera assembly 220 can distinguish the fine details of the boundaries between individual pixel elements of the electronic display panel 145 (e.g., the boundaries of each subpixel in the electronic display panel 145). When determining the sharpness of the captured image, the VID tester 230 can determine the sharpness of the boundaries between the pixel elements and other visible elements at this fine detail level, in addition to, or instead of, determining the sharpness of a VID test pattern. Furthermore, in this case, the VID test pattern may be an image with uniform pixel values over the entire pattern.

In one embodiment, the exposure settings for the imaging sensor assembly 225 for the range of images captured over the back focus adjustment path 350 are fixed to particular settings. These settings may have been selected such that, when capturing the VID test pattern, the images captured by the imaging sensor assembly 225 do not exhibit significant artifacts or unwanted properties that would affect the determination of the sharpness of the captured image. For example, bloom (e.g., in the form of an Airy disk pattern) may not be desired as it can cause the determination of sharpness of objects to be affected negatively. Thus, the exposure settings may be reduced such that a minimal exposure time is set which is sufficient to capture the details of the VID test pattern down to the individual pixel but without being significantly affected by bloom.

In one embodiment, the captured images are associated with imaging sensor assembly positions which are too coarse to determine a point of maximum sharpness. In other words, the discrete nature of the data collection and the sample size does not ensure that the captured image with the maximum sharpness is the actual image captured at a position of the imaging sensor assembly 225 with the maximum sharpness in the image. In such a case, the VID tester 230, for each color channel, further fits a curve, such as a parabola, to a plot of the imaging sensor assembly 225 positions and determined sharpness levels for that color, and estimates using the curve the position of the imaging sensor assembly 225 at the maximum sharpness point on the curve.

In one embodiment, the VID tester 230 determines a range of imaging sensor assembly 225 positions at which a maximum sharpness is achieved. This may help to reduce errors if the received data is not completely accurate due to measurement errors or other issues.

In one embodiment, the VID tester 230 also compares the captured data with data from other optical evaluation workstations to ensure that no systemic error exists in the optical evaluation workstation 200. For example, the same eyecup assembly may be tested in multiple optical evaluation workstations 200 to ensure that each workstation is outputting the same values. If an error exists, such that the values outputted by the different workstations has a variance beyond a threshold level, the VID tester 230 may indicate an error condition to a user. The error may indicate an error in the alignment of the eyecup assembly 125 and the camera assembly 220, a calibration error, or something else.

After determining for each color the position of the imaging sensor assembly 225 that results in the maximum sharpness, the VID tester 230 determines the virtual image distance (VID) or a range of VIDs of the virtual image produced by the eyecup assembly 125. In one embodiment, to determine the VID, the VID tester 230 accesses a table that stores associations between VIDs and imaging sensor assembly 225 positions.

The table may be created a priori. For example, one or more imaging sensor assemblies 270 may have been placed in front of an optics block and electronic display panel. The internal distance between the optics block and an electronic display panel is varied. After each change in this internal distance, the imaging sensor assembly 225 is moved through the back focus adjustment path and captures images as described above. The images are split into the respective color channels, and the sharpness determined for each image. The maximum sharpness is determined over the set of images, with the corresponding imaging sensor assembly 225 position noted. The data generated can be used to create the above mentioned table.

Alternatively, the VID can be determined based on knowledge of the focal length or lens power (diopter) of the optics block (which may be determined experimentally) and the known distance between the electronic display panel and the optics block, using, for example, the Gaussian form of the common lens equation. A different equation may also be used in order to account for the thickness of the optics block, and so on. The VID may also be determined in other ways, such as experimentally.

In one embodiment, instead of looking up the VID in a table, the VID tester 230 computes the VID dynamically (i.e., on-the-fly). Using knowledge of the position of the imaging sensor assembly 225 at points of maximum sharpness, the VID tester 230 may be able to calculate the VID dynamically using this knowledge as well as the diopter of the optics block 135. The VID tester 230 may use the VID value as the quality metric indicating the virtual image distance of images produced by the eyecup assembly. The dynamic computation may be useful if the diopter of the optics block 135 varies between eyecup assemblies.

In one embodiment, the VID tester 230 determines the VID of multiple local regions of interest of the captured VID test pattern. The VID tester 230 may divide the captured image of the VID test pattern into a grid, and determine the maximum sharpness for each individual grid location or position (i.e., areas on the image demarcated by the grid boundaries).

The grid pattern, i.e., number of grid locations, dimensions of the boundaries of each grid location, and so on, may be provided by a user beforehand. A number of eyecup assemblies may be tested beforehand to see a mean optical distortion or variation per unit area of the optics blocks of the eyecup assemblies that deviate from an expected result for an ideal optics block (i.e., one that meets design specifications). This variation per unit area may determine the resolution of the grid pattern (i.e., number of grid locations), with higher variation per unit area indicating the need for a higher resolution grid pattern. The grid pattern spans the entire area of the captured image.

For example, the VID tester 230 may divide the captured image into a 5×5 grid, and compute the VID for the pixels in each grid area (of which there are 25), according to the method described above (e.g., for each color channel, using the multiple captured images). This is further discussed below with regard to FIG. 5.

In one embodiment, the VID tester 230 determines the maximum sharpness by generating MTFs, or modulation transfer functions, for each captured image and color channel. An MTF can be a curve that indicates the contrast (or modulation) level at different resolutions (e.g., lines per millimeter) in the image. The contrast level as measured in the MTF 15 proportional to the sharpness of the image, with higher contrast levels for a particular resolution indicating higher sharpness. The contrast can be measured by the VID tester 230 using the Sobel operator, which as noted, measures the change in the gradient between edges, or using any other contrast detection technique. If an image (or portion of an image) has relatively increased sharpness, then the MTF curve for that image (or portion) has a larger area under the curve compared to the MTF of an image which is not as sharp. Thus, the image with the maximum sharpness is the image with the maximum area under its MTF curve. The MTF curve can be generated by the VID tester 230 by instructing the imaging sensor assembly 225 to capture a VID test pattern that displays geometric patterns (e.g., of lines) at varying resolutions (e.g., lines per millimeter). The VID tester 230 can evaluate the change in contrast for each pattern at each resolution to determine the MTF curves, and subsequently, the maximum sharpness and VID of the eyecup assembly 125 under test.

In one embodiment, the VID tester 230 generates a report based on the determination of the quality metric indicating the VID of the eyecup assembly 125 being tested. The report indicates the VID or VID range of the eyecup assembly, and may also indicate whether this result is within a threshold range.

The report may then be provided by the VID tester 230 to a user, to a log, or other component. In one embodiment, if the eyecup assembly 125 has a score that falls outside the threshold range, the affected eyecup assembly 125 may be removed from the assembly process and the VID tester 230 may instruct the eyecup assembly feeder 215 to place the affected eyecup assembly 125 in a separate holding area.

In one embodiment, the VID tester 230 marks eyecup assemblies that have similar VID (or VID ranges) for paring such that these eyecup assemblies may be both placed in the same HMD during subsequent assembly.

After the quality tests are completed, the control module 210 can instruct the eyecup assembly feeder 215 to remove or replace the eyecup assembly 125 currently being tested with another eyecup assembly.

Exemplary Schematic of Eyecup Test Assembly

Figure 3:
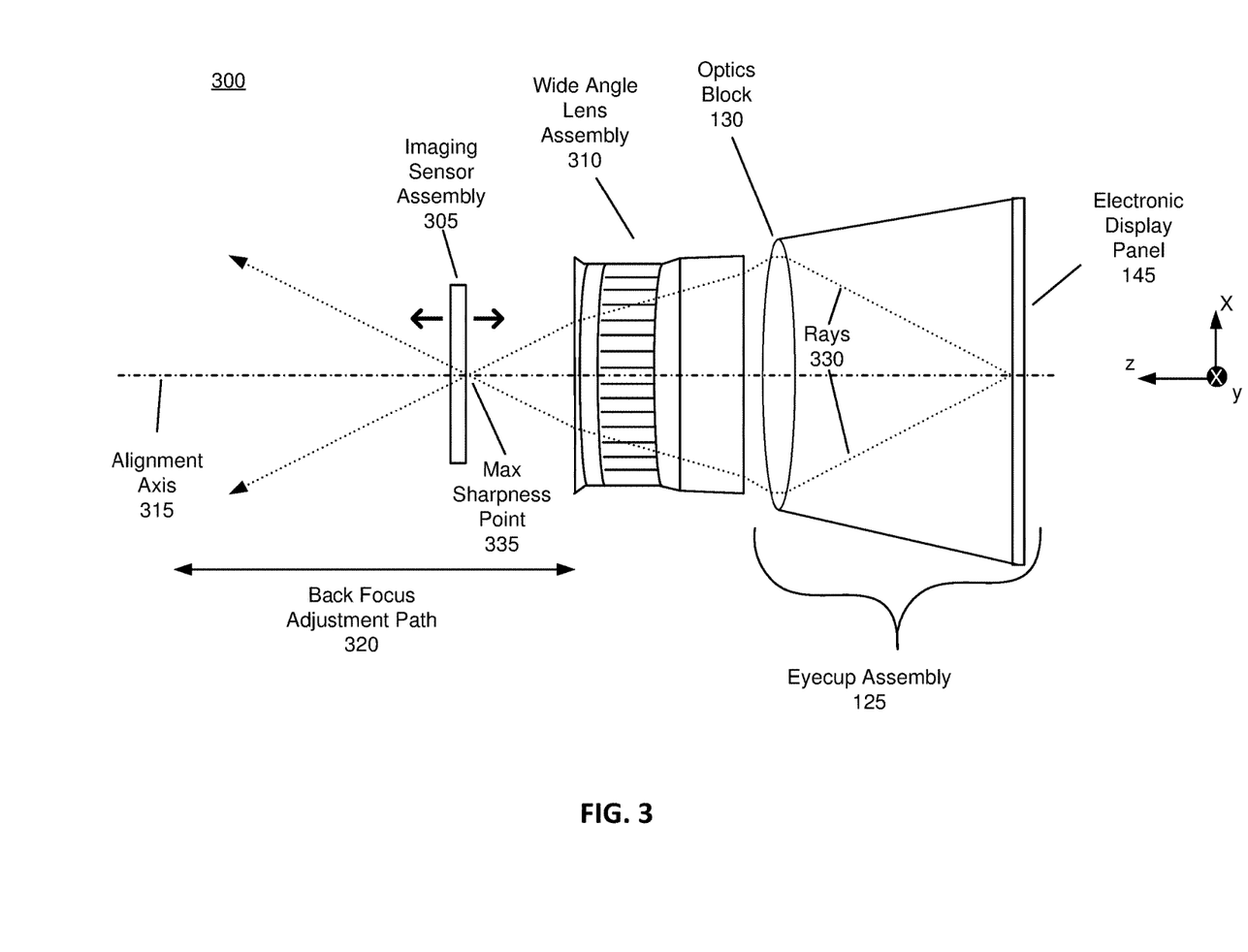
FIG. 3 illustrates components of an exemplary eyecup test assembly for eyecup assemblies, in accordance with an embodiment.

FIG. 3 illustrates components of an exemplary eyecup test assembly 300 for eyecup assemblies according to an embodiment. Some embodiments of the eyecup test assembly 300 have different components than those described here. Similarly, the functions can be distributed among the components in a different manner than is described here. In some embodiments, the eyecup test assembly 300 is an embodiment of the optical test assembly 205 shown in FIG. 2. The optical test assembly 300 includes an imaging sensor assembly 305 and a wide angle lens assembly 310. The optical test assembly 300 evaluates an eyecup assembly 125 under test.

The imaging sensor assembly 305 captures images as produced by the eyecup assembly 125 under test. The imaging sensor assembly 305 includes an image sensor to capture images as well as other control circuitry and components typical of an imaging device (e.g., image processor, aperture control, physical/electronic shutter, etc.). In one embodiment, the imaging sensor assembly 305 may include the camera body of a digital single-lens reflex (DSLR) camera, however, in other embodiments, the imaging sensor assembly 305 may be another type of imaging device, such as a digital video recorder, a mirrorless camera, CCD image sensor, CMOS image sensor etc. In some embodiments, the imaging sensor assembly 305 may include one or more optical lenses.

The imaging sensor assembly 305 is coupled to a track, path, or other assembly that allows the imaging sensor assembly 305 to move along both directions of the alignment axis 315, and in particular, allows the imaging sensor assembly 305 to move to any position along the alignment axis 315 as indicated by the back focus adjustment 330 path 320. The alignment axis 315 is an axis along a Z direction as shown which passes through the center of the eyecup assembly 125 under test and the wide angle lens assembly 310. As noted above, the imaging sensor assembly 305 captures images at different positions throughout the back focus adjustment 330 path 320 in order for the VID of the eyecup assembly 125 under test to be determined by the VID tester 230. In particular, these positions may be defined as ranging from a first position (at one end of the back focus adjustment path) to a second position (at another end of the path). The first position may be a position at which the imaging sensor assembly 305 comes in contact with the wide angle lens assembly 310, and the second position may be a position at which the imaging sensor assembly 305 reaches the end of the available space or track provided by the eyecup test assembly 300. The imaging sensor assembly 305 may be moved using a servo motor, pulley system, linear motor, magnetic system, pneumatic system, or other means of movement that can provide accurate and repeatable movement of the imaging sensor assembly 305.

The wide angle lens assembly 310 is fixed centrally at a position along the alignment axis 315 between the eyecup assembly 125 under test and the imaging sensor assembly 305. The wide angle lens assembly 310 gathers light from an aperture facing the eyecup assembly 125 under test, and directs this light to the image sensor of the imaging sensor assembly 305. In one embodiment, the wide angle lens assembly 310 is a wide angle lens (e.g., with a FOV that allows the image captured by the wide angle lens to capture the entire image produced by the electronic display panel 145), however in other embodiments the wide angle lens assembly 310 simply has a focal distance sufficient to be able to keep in focus the entire area of the electronic display panel 145. In some embodiments, the wide angle lens assembly 310 is placed at an exit pupil location of the eyecup assembly 125 such that it is at a position in front of the eyecup assembly 125 under test corresponding to a position of a human eye relative to the eyecup assembly 125 when a user wears the HMD 100 that includes the eyecup assembly 125. In other embodiments, the wide angle lens assembly 310 may be placed at other locations relative to the eyecup assembly 125. In one embodiment, the wide angle lens assembly 310 may have a small aperture to reduce the effect of depth of field.

The wide angle lens assembly 310 may be positioned along the alignment axis 315 to minimize light entering the wide angle lens assembly 310 that was not generated by the eyecup assembly 125. This may be achieved by a structural feature of the eyecup assembly itself (e.g., a molding that circumscribes the aperture of the wide angle lens assembly 310) or via an external structural element that blocks external light sources from transmitting light to the system.

As illustrated in FIG. 3, light rays 330 (of a single wavelength) are emitted by the electronic display panel 145. These rays 330 are modified (e.g., refracted) by the optics block 135, and also by the wide angle lens assembly 310. The rays 330 converge behind the wide angle lens assembly 310 and reach a maximum sharpness point 335. To determine the focal distance along the back focus adjustment path at which maximum sharpness is achieved, the imaging sensor assembly 305 is moved along the back focus adjustment 330 path 320 and captures images at different locations along the back focus adjustment 330 path 320. The image with the sharpest features is captured at the maximum sharpness point 335, and a VID is computed based on the position of the imaging sensor assembly 305 at this maximum sharpness point 335. The position of the imaging sensor assembly 305 may be measured by how far the imaging sensor assembly 305 is from the wide angle lens assembly 310 at this maximum sharpness point 335. Note that the position of the maximum sharpness point 335 is indicated here for illustrative purposes only and is not necessarily drawn to scale, and in an actual production environment the position of the maximum sharpness may vary.

Exemplary Sharpness to Imaging Sensor Assembly Position Plot

Figure 4:
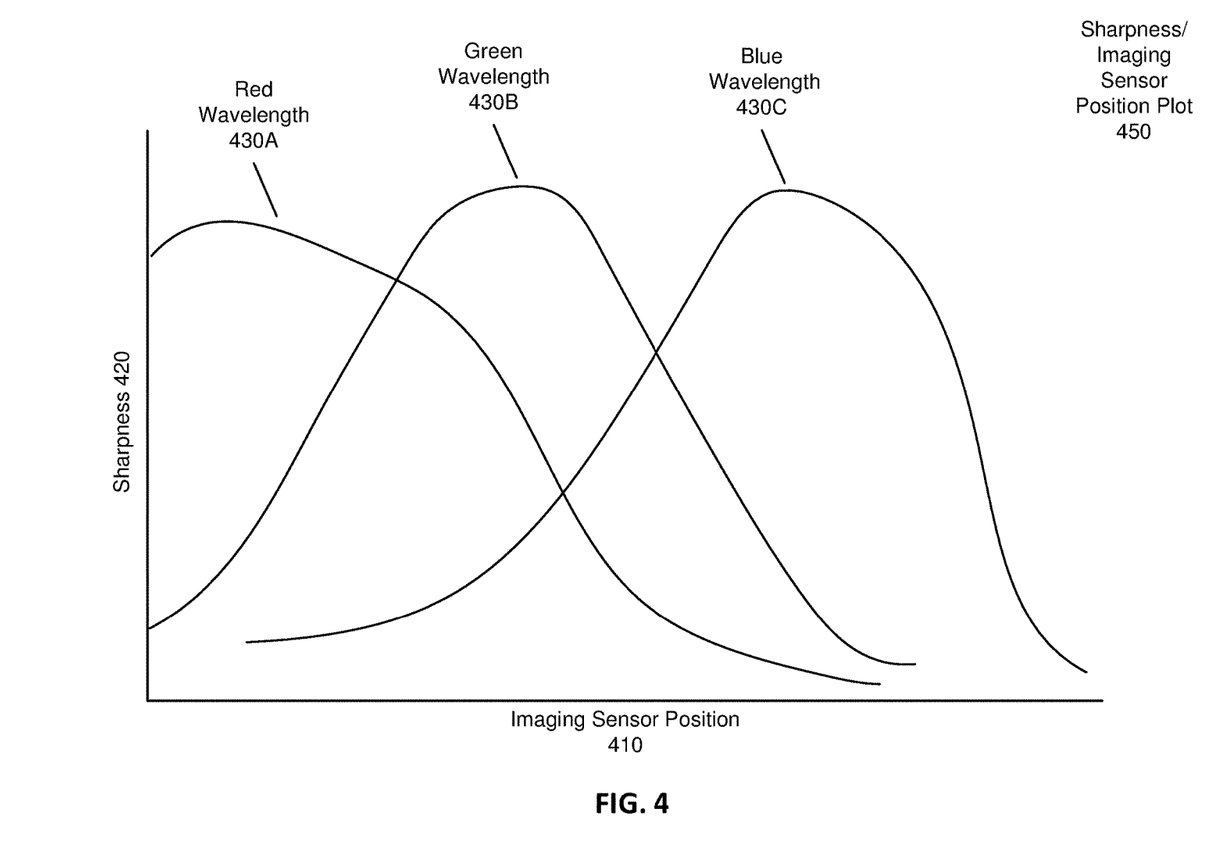
FIG. 4 illustrates an example of a plot of sharpness to imaging sensor assembly position plot for red, blue, and green wavelengths, in accordance with an embodiment.

FIG. 4 illustrates an example of a plot 450 of sharpness to imaging sensor assembly position plot for red, blue, and green wavelengths, in accordance with an embodiment. The position corresponds to the position of the imaging sensor assembly 225 along the back focus adjustment path 350, e.g., the distance of the imaging sensor assembly 225 from the wide angle lens assembly. As noted above, the sharpness at each focal distance may be determined directly, or via the use of MTFs (modulation transfer functions).

As shown in FIG. 4, due to the different wavelengths of each color and the varying effect of the lens elements in the path of the light on different wavelengths of light, the point of maximum sharpness varies for each of the colors tested. Additionally, the sharpness 420 for each color tapers off in both directions from the position of the imaging sensor assembly where maximum sharpness is achieved. In particular, the red wavelength 430A achieves max sharpness at a smaller position value than the green wavelength 430B, which achieves max sharpness at a smaller position value than the blue wavelength 430C. The reason each wavelength (i.e., color) achieves maximum sharpness at a different position of the imaging sensor assembly 225 is due to longitudinal chromatic aberration, i.e., the eyecup assembly 125 under test does not bring every wavelength of color to the exact same focal plane. Thus, the maximum sharpness for each color is slightly different, so that the VID tester 230 determines the maximum sharpness of each color separately, as described above.

As noted, after determining the maximum sharpness, the VID tester 230 determines the VID of the eyecup assembly 125 under test. Each color channel (i.e., wavelength) may have a different VID, and the different VIDs may be combined (e.g., in a weighted average) to produce a final VID value for the eyecup assembly 125 under test.

Figure 5:
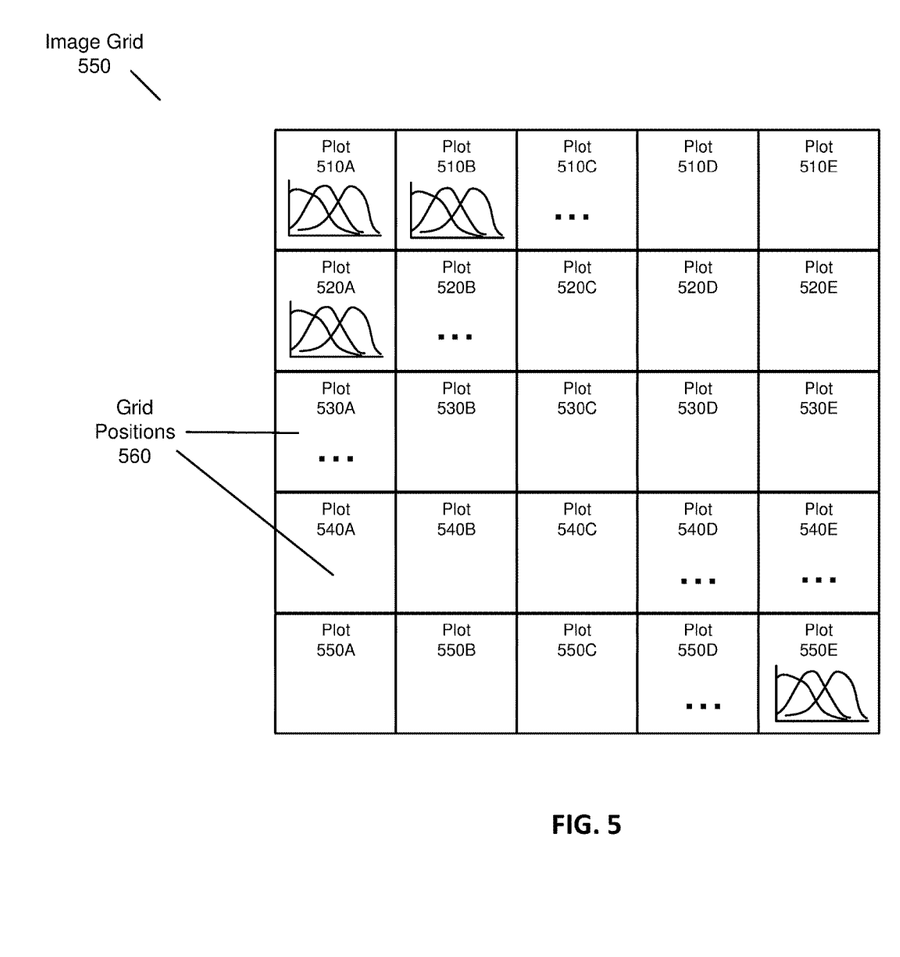
FIG. 5 illustrates a representation of multiple sharpness plots within a grid corresponding to areas on the captured image, in accordance with an embodiment.

FIG. 5 shows an image grid 550 illustrating the determination of multiple sharpness/imaging sensor assembly position plots for each grid position (e.g., grid positions 560) in the captured images, according to an embodiment.

As a refinement of the method described above, instead of determining the sharpness of the entire image as a whole, the captured images may be divided into an image grid 550 as shown, and the maximum sharpness for each grid position is determined separately from the maximum sharpness of the other grid positions. To determine the maximum sharpness of each grid position, a similar process as the one described above can be used by the VID tester 230 to plot, for each grid position, the position of the imaging sensor assembly 225 versus sharpness for each color channel. In the illustrated image grid 550, this results in the 25 sharpness to imaging sensor assembly position plots 510A-510E, 520A-E, 530A-E, 540A-E, and 550A-E, each corresponding to a grid position. The position of the imaging sensor assembly 225 at the point of maximum sharpness for each grid position is used to determine a VID. Furthermore, the computation of the VID for each grid position may vary from other grid positions. For example, the imaging sensor assembly position to VID tables (as described above) for each grid position may be different. This may be due to the fact that the optics block 135 is not perfect (e.g., not parabolic), and thus focuses differently for each region of the image.

The multiple VIDs determined by the VID tester 230 for each grid position may subsequently be combined to produce a final VID value. For example, the VID values for grid positions in the center portion of the image may be weighted relatively higher compared to the VID values for grid positions near the edge of the image, as a user will likely focus more on the center of the image. This final VID value, and/or the individual VID values for each grid position, are reported out and may be used to pair different eyecup assemblies together, as described above.

Exemplary Flow

Figure 6:
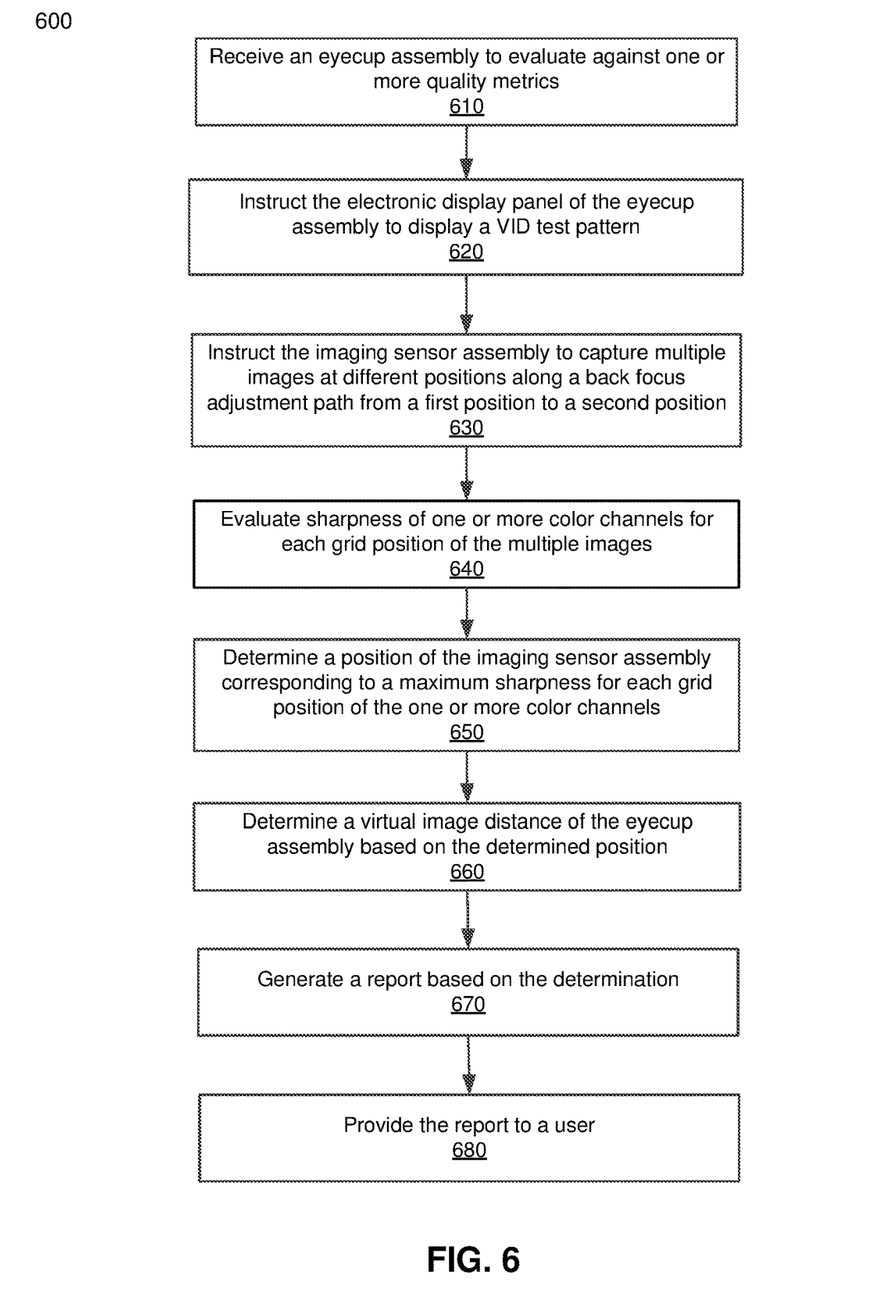
FIG. 6 is a flow chart illustrating a process for determining the virtual image distance for an eyecup assembly of an HMD, in accordance with an embodiment.

FIG. 6 is a flow chart illustrating a process 600 for determining the virtual image distance for an eyecup assembly (e.g., an eyecup assembly 125) of an HMD (e.g., HMD 100), in accordance with one embodiment. The process of FIG. 6 may be performed by the optical evaluation workstation 200. Other entities may perform some or all of the steps of the process in other embodiments. Likewise, embodiments may include different and/or additional steps, or perform the steps in different orders.

The optical evaluation workstation 200 receives 610 an eyecup assembly to be tested and evaluated against one or more quality metrics. For example, the optical evaluation workstation 200 can receive from a user an eyecup assembly in a structural element of the optical evaluation workstation 200. The optical evaluation workstation 200 places the received eyecup assembly in a testing position. The testing position simulates the position of the eyecup assembly in an HMD as described above. As another example, the optical evaluation workstation 200 automatically retrieves a new eyecup assembly and places it in the structural element of the optical evaluation workstation 200 for testing.

The optical evaluation workstation 200 instructs 620 an electronic display panel (e.g., electronic display panel 145) of the eyecup assembly being tested to display a VID test pattern. For example, the VID test pattern may be an image with a geometric pattern. In one embodiment, prior to instructing the electronic display panel to display the VID, the optical evaluation workstation 200 determines a mapping between the pixels of the imaging sensor of the camera of the optical evaluation workstation 200 and the pixels of the electronic display panel.

The optical evaluation workstation 200 instructs 630 an imaging sensor assembly to capture multiple images of the VID test pattern at different positions along a back focus adjustment path from a first position to a second position. The imaging sensor assembly may be instructed to capture the images at a uniform time intervals, continuously (e.g., as fast as possible), or at shorter time intervals near the middle of the back focus adjustment path and at longer intervals elsewhere. The imaging sensor assembly may stop moving each time an image is captured, or may continue to move as the images are captured.

The optical evaluation workstation 200 evaluates 640 the sharpness of one or more color channels for each grid position of the multiple images. In one embodiment, the optical evaluation workstation 200 determines the sharpness of each color channel of each image using a Sobel operator.

The optical evaluation workstation 200 determines 650 a position of the imaging sensor assembly corresponding to a maximum sharpness value for each grid position of the one or more color channels. In one embodiment, the optical evaluation workstation 200 fits a curve to the position of the imaging sensor assembly versus sharpness data for each grid position and color channel and determines a focal distance where the sharpness curve is at a maximum (i.e., highest) for that grid position and color channel.

The optical evaluation workstation 200 determines 660 a virtual image distance of the eyecup assembly based on the determined position of the imaging sensor assembly. The VID may be determined for each grid position, and combined (e.g., in a weighted average) to produce an overall VID. The optical evaluation workstation 200 may determine the VID from the position using a pre-computed table that was generated experimentally. In one embodiment, if the VID is determined to fall outside a threshold range, the optical evaluation workstation 200 determines that the eyecup assembly does not meet the quality metric for VID.

The optical evaluation workstation 200 generates 670 a test report based on the determination of the VID. The test report may, e.g., indicate the eyecup assembly does/does not meet the quality metric. The optical evaluation workstation 200 presents 680 the test report to a user.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. An optical evaluation workstation comprising:
   an eyecup assembly feeder configured to receive an eyecup assembly of a head mounted display (HMD), the eyecup assembly comprising an optics block and an electronic display panel, and the electronic display panel is presenting one or more test patterns;
   a lens assembly positioned at a fixed distance from the eyecup assembly along an alignment axis passing through the optics block and electronic display panel of the eyecup assembly;
   an imaging sensor assembly positioned along the alignment axis and configured to capture one or more images of the one or more test patterns presented by the electronic display panel through the optics block and the lens assembly; and
   a processor configured to:
   instruct the imaging sensor assembly to move along a back focus adjustment path, the back focus adjustment path being a path along the alignment axis from a first position to a second position; and
   instruct the imaging sensor assembly to capture a plurality of images when the imaging sensor assembly is at different positions along the back focus adjustment path;
   determine, for multiple of the plurality of images captured by the imaging sensor assembly, a level of sharpness for one or more color channels of each image of the multiple images;
   select, for each color channel, an image having a highest level of sharpness for that color channel;
   determine, for each selected image, a respective position of the imaging sensor assembly associated with the selected image; and
   determine one or more virtual image distances for the eyecup assembly based on the determined positions of the imaging sensor assembly for each selected image, a virtual image distance being a distance from a position of the exit pupil of the eyecup assembly to a virtual image of the electronic display panel, as viewed through the optics block.

2. The optical evaluation workstation of claim 1, wherein the imaging sensor assembly is movable, and wherein the processor is further configured to:
   instruct the electronic display panel to display a test pattern.

3. The optical evaluation workstation of claim 1, wherein the processor is further configured to:
   separate each of the plurality of captured images into sets of single color channel images, each set of single color channel images including images extracted from the plurality of captured images having one color channel;

determine a plurality of sharpness values of the images in each set of the single color channel images;
generate a sharpness curve for each color channel using the sharpness values determined for the corresponding set of single color channel images for that color channel;
determine a maximum sharpness value of the sharpness curve for each color channel; and
determine the position of the imaging sensor assembly associated with the maximum sharpness value for each color channel.

4. The optical evaluation workstation of claim 3, wherein the processor is further configured to:
determine the sharpness value for each image in a set of single color channel images based on the gradient values produced by a Sobel operator applied to that image.

5. The optical evaluation workstation of claim 3, wherein the processor is further configured to:
determine a virtual image distance for a position of the imaging sensor assembly by accessing a stored table, each entry of the stored table associating a position of the imaging sensor assembly with a virtual image distance of the eyecup assembly, the stored table generated based on experimental data.

6. The optical evaluation workstation of claim 1, wherein the control module processor is further configured to:
divide each captured image in accordance with a grid, each section of the grid of each captured image indicated by a grid position;
determine for each grid position in each of the plurality of captured images, a level of sharpness for one or more color channels of each grid position of each captured image;
select, for each color channel and grid position, an image having a highest level of sharpness for that color channel and grid position;
determine, for each selected image, a respective position of the imaging sensor assembly associated with the selected image; and
determine the one or more virtual image distances for the eyecup assembly based on the determined positions of the imaging sensor assembly for each selected image.

7. The optical evaluation workstation of claim 6, wherein the processor is further configured to:
separate each of the plurality of captured images into sets of single color channel images, each set of single color channel images including images extracted from the plurality of captured images having one color channel;
divide each image of each of the sets of single color channel images according to the grid;
determine a plurality of sharpness values of each grid position of each image in each of the sets of single color channel images;
generate a sharpness curve for each color channel and grid position using the sharpness values determined for the corresponding grid positions in each of the sets of single color channel images for that color channel;
determine a maximum sharpness value of the sharpness curve for each color channel and grid position; and
determine the positions of the imaging sensor assembly of the captured images having the maximum sharpness value for each color channel and grid position.

8. The optical evaluation workstation of claim 1, wherein the processor is further configured to:
generate a report for the determined virtual image distance, the report indicating whether the determined virtual image distance is within a threshold range of acceptable virtual image distances.

9. A method comprising:
receiving an eyecup assembly of a head mounted display (HMD), the eyecup assembly comprising an optics block rigidly fixed at a first distance to an electronic display panel;
instructing an electronic display panel of the eyecup assembly to display a virtual image distance test pattern;
instructing an imaging sensor assembly to capture multiple images at different positions along a back focus adjustment path from a first position to a second position; and
determining for each of the plurality of images, a level of sharpness for one or more color channels of each image;
selecting for each color channel, an image having a highest level of sharpness for that color channel;
determining, for each selected image, a respective position of the imaging sensor assembly associated with the selected image; and
determining one or more virtual image distances for the eyecup assembly based on the determined positions of the imaging sensor assembly for each selected image, wherein a virtual image distance is a distance from a position of the exit pupil of the eyecup assembly to a virtual image of the electronic display panel, as viewed through the optics block.

10. The method of claim 9, further comprising:
separating each of the plurality of captured images into sets of single color channel images, each set of single color channel images including images extracted from the plurality of captured images having one color channel;
determining a plurality of sharpness values of the images in each set of the single color channel images;
generating a sharpness curve for each color channel using the sharpness values determined for the corresponding set of single color channel images for that color channel;
determining a maximum sharpness value of the sharpness curve for each color channel; and
determining the position of the imaging sensor assembly associated with the maximum sharpness value for each color channel.

11. The method of claim 10, further comprising:
determining the sharpness value for each image in a set of single color channel images based on the gradient values produced by a Sobel operator applied to that image.

12. The method of claim 10, further comprising:
determining a virtual image distance for a position of the imaging sensor assembly by accessing a stored table, each entry of the stored table associating a position of the imaging sensor assembly with a virtual image distance of the eyecup assembly, the stored table generated based on experimental data.

13. The method of claim 9, further comprising:
dividing each captured image in accordance with a grid, each section of the grid of each captured image indicated by a grid position;
determining for each grid position in each of the plurality of captured images, a level of sharpness for one or more color channels of each grid position of each captured image;

selecting, for each color channel and grid position, an image having a highest level of sharpness for that color channel and grid position;

determining, for each selected image, a respective position of the imaging sensor assembly associated with the selected image; and determining the one or more virtual image distances for the eyecup assembly based on the determined positions of the imaging sensor assembly for each selected image.

14. The method of claim 13, further comprising:

separating each of the plurality of captured images into sets of single color channel images, each set of single color channel images including images extracted from the plurality of captured images having one color channel;

dividing each image of each of the sets of single color channel images according to the grid;

determining a plurality of sharpness values of each grid position of each image in each of the sets of single color channel images;

generating a sharpness curve for each color channel and grid position using the sharpness values determined for the corresponding grid positions in each of the sets of single color channel images for that color channel;

determining a maximum sharpness value of the sharpness curve for each color channel and grid position; and determining the positions of the imaging sensor assembly of the captured images having the maximum sharpness value for each color channel and grid position.

15. The method claim 9, further comprising:

generating a report for the determined virtual image distance, the report indicating whether the determined virtual image distance is within a threshold range of acceptable virtual image distances.

16. An optical evaluation workstation comprising:

an eyecup assembly feeder configured to receive an eyecup assembly of a head mounted display (HMD), the eyecup assembly comprising an optics block and an electronic display panel, and the electronic display panel is presenting one or more test patterns;

a lens assembly positioned at a fixed distance from the eyecup assembly along an alignment axis passing through the optics block and electronic display panel of the eyecup assembly;

an imaging sensor assembly positioned along the alignment axis and configured to capture one or more images of the one or more test patterns presented by the electronic display panel through the optics block and the lens assembly; and a processor configured to:

instruct the imaging sensor assembly to move along a back focus adjustment path, the back focus adjustment path being a path along the alignment axis from a first position to a second position; and instruct the imaging sensor assembly to capture the plurality of images when the imaging sensor assembly is at different positions along the back focus adjustment path;

determine, for multiple of the plurality of images, a level of sharpness for one or more color channels of each of the multiple images;

select, for each color channel, an image having a highest level of sharpness for that color channel;

determine, for each selected image, a respective position of the imaging sensor assembly associated with the selected image; and determine one or more virtual image distances for the eyecup assembly based on the determined positions of the imaging sensor assembly for each selected image, a virtual image distance being a distance from a position of the exit pupil of the eyecup assembly to a virtual image of the electronic display panel, as viewed through the optics block, generate a report based on the determination of the one or more virtual image distances, and provide the report to a user.

17. The optical evaluation workstation of claim 16, wherein the imaging sensor assembly is movable, and wherein the control module is further configured to:

instruct the electronic display panel to display a test pattern.

18. The optical evaluation workstation of claim 16, wherein the processor is further configured to:

separate each of the plurality of captured images into sets of single color channel images, each set of single color channel images including images extracted from the plurality of captured images having one color channel;

determine a plurality of sharpness values of the images in each set of the single color channel images;

generate a sharpness curve for each color channel using the sharpness values determined for the corresponding set of single color channel images for that color channel;

determine a maximum sharpness value of the sharpness curve for each color channel; and determine the position of the imaging sensor assembly associated with the maximum sharpness value for each color channel.

19. The optical evaluation workstation of claim 18, wherein the processor is further configured to:

determine the sharpness value for each image in a set of single color channel images based on the gradient values produced by a Sobel operator applied to that image.

20. The optical evaluation workstation of claim 16, wherein the processor is further configured to:

divide each captured image in accordance with a grid, each section of the grid of each captured image indicated by a grid position;

determine for each grid position in each of the plurality of captured images, a level of sharpness for one or more color channels of each grid position of each captured image;

select, for each color channel and grid position, an image having a highest level of sharpness for that color channel and grid position;

determine, for each selected image, a respective position of the imaging sensor assembly associated with the selected image; and determine the one or more virtual image distances for the eyecup assembly based on the determined positions of the imaging sensor assembly for each selected image.

* * * * *

UNITED STATES PATENT AND TRADEMARK OFFICE
CERTIFICATE OF CORRECTION

PATENT NO. : 10,430,939 B1
APPLICATION NO. : 15/687666
DATED : October 1, 2019
INVENTOR(S) : Kieran Tobias Levin et al.

Page 1 of 1

It is certified that error appears in the above-identified patent and that said Letters Patent is hereby corrected as shown below:

In the Claims

In Column 19, Claim 15, Line 31, delete "The method claim 9," and insert --The method of claim 9,--, therefor.

Signed and Sealed this
Nineteenth Day of May, 2020

Andrei Iancu
*Director of the United States Patent and Trademark Office*